United States Patent
Lipman et al.

(10) Patent No.: US 9,283,477 B2
(45) Date of Patent: Mar. 15, 2016

(54) SYSTEMS AND METHODS FOR PROVIDING SOCIAL GAMES FOR COMPUTING DEVICES

(71) Applicants: Steven Lipman, Scotts Valley, CA (US); Luan Xi Tran, Burlingame, CA (US); Jacob Ariel Knobel, New York, NY (US); Julie Vaughn Ruef, San Francisco, CA (US); Ethan Nagel, San Francisco, CA (US); Stacy Nagel, San Francisco, CA (US); David Boyarin Blundell, San Francisco, CA (US); David Scott Robinson, Palo Alto, CA (US)

(72) Inventors: Steven Lipman, Scotts Valley, CA (US); Luan Xi Tran, Burlingame, CA (US); Jacob Ariel Knobel, New York, NY (US); Julie Vaughn Ruef, San Francisco, CA (US); Ethan Nagel, San Francisco, CA (US); Stacy Nagel, San Francisco, CA (US); David Boyarin Blundell, San Francisco, CA (US); David Scott Robinson, Palo Alto, CA (US)

(73) Assignee: AOL Inc., Dulles, VA (US)

( * ) Notice: Subject to any disclaimer, the term of this patent is extended or adjusted under 35 U.S.C. 154(b) by 12 days.

(21) Appl. No.: 13/837,204

(22) Filed: Mar. 15, 2013

(65) Prior Publication Data

US 2014/0087881 A1    Mar. 27, 2014

Related U.S. Application Data

(60) Provisional application No. 61/706,069, filed on Sep. 26, 2012.

(51) Int. Cl.
| | | |
|---|---|---|
| A63F 13/00 | (2014.01) |
| A63F 13/30 | (2014.01) |
| A63F 13/655 | (2014.01) |
| A63F 13/497 | (2014.01) |
| A63F 13/335 | (2014.01) |

(52) U.S. Cl.
CPC ............. *A63F 13/12* (2013.01); *A63F 13/335* (2014.09); *A63F 13/497* (2014.09); *A63F 13/655* (2014.09)

(58) Field of Classification Search
CPC ....... A63F 13/00; A63F 13/005; A63F 13/10; A63F 2300/572; G06F 3/0421; G06F 3/0488; G06F 2203/04101; G06F 2203/04109; G06F 2203/04808; G06F 3/0412; G06F 3/04883; G06F 3/041; G06F 3/046; G06K 9/3258; G06K 9/3283; G10L 15/22; G10L 2015/223; G10L 21/00; H04H 20/38; H04H 60/15; H04M 19/04; H04M 1/0268; H04M 1/57; H04M 1/72527; H04M 2250/12; H04Q 3/0029; H04R 3/00; H04W 12/06; G07F 17/32; G07F 17/3223; G07F 17/3232; G07F 17/323; G07F 17/3244; G07F 17/3227; G07F 17/3225; G07F 17/3234; G07F 17/3276; G07F 17/3272; G07F 17/3209; G07F 17/3218; G07F 17/3237; G07F 17/03
See application file for complete search history.

(56) References Cited

U.S. PATENT DOCUMENTS 4,662,635 A * 5/1987 Enokian .......................... 463/31
5,679,075 A * 10/1997 Forrest et al. .................... 463/9

(Continued)

*Primary Examiner* — Sunit Pandya
(74) *Attorney, Agent, or Firm* — Finnegan, Henderson, Farabow, Garrett & Dunner LLP (57) ABSTRACT

Computer-implemented systems and methods are disclosed for providing social games. In accordance with one implementation, a computer-implemented method comprises receiving a selection from a user to activate the social game. The method also includes receiving, with at least one processor, the previously recorded content for the social game. In accordance with the present disclosure, the method also includes playing back, in response to the selection, the previously recorded content to the user and recording the user's interaction with the previously recorded content while playing back the previously recorded content.

21 Claims, 6 Drawing Sheets

(56) References Cited

U.S. PATENT DOCUMENTS

| | | |
|---|---|---|
| 8,465,355 B1* | 6/2013 | Liang ................................ 463/9 |
| 8,696,469 B2* | 4/2014 | Youm et al. ..................... 463/42 |
| 2003/0027621 A1* | 2/2003 | Libby et al. ..................... 463/17 |
| 2009/0150553 A1* | 6/2009 | Collart et al. ................. 709/229 |
| 2010/0160038 A1* | 6/2010 | Youm et al. ..................... 463/29 |
| 2010/0293598 A1* | 11/2010 | Collart et al. ..................... 726/3 |
| 2012/0028718 A1* | 2/2012 | Barclay et al. .................. 463/42 |
| 2012/0178073 A1* | 7/2012 | Wasmund ..................... 434/362 |
| 2012/0184363 A1* | 7/2012 | Barclay et al. .................. 463/25 |

* cited by examiner

SYSTEMS AND METHODS FOR PROVIDING SOCIAL GAMES FOR COMPUTING DEVICES

CROSS-REFERENCE TO RELATED APPLICATIONS

This application claims the benefit of priority to U.S. Provisional Application No. 61/706,069, filed on Sep. 26, 2012, the entire disclosure of which is expressly incorporated herein by reference in its entirety.

BACKGROUND

1. Technical Field

The present disclosure relates to, among other things, computerized systems and methods for providing social games. More particularly, and without limitation, the present disclosure relates to computerized systems and methods for acquiring, playing, sharing, and updating cross-platform computing device games through a network-based environment.

2. Background

Computing devices, such as desktops, smart-phones, mobile phones, tablet PCs, laptops, and handheld devices have become widespread and important to the daily activities of many consumers and businesses. For example, mobile devices, traditionally, have primarily served as communications devices. Recently, however, consumers are increasingly relying upon these devices as an integral tool in the performance of a wide-range of personal and work-related tasks. In response, mobile phones, tablets, personal digital assistants (PDAs), and other wireless handheld devices have evolved into complex computing devices with equally complex computer hardware and software.

While many of these mobile devices continue to be used for various forms of communication (e.g., voice calls and text messaging) they also generally provide other various functionalities, including accessing and displaying websites, sending and receiving e-mails, taking and displaying photographs and videos, playing music and games, etc.

Social games allow friends and members of social networks to interact with each other. However, these games fail to effectively use modern communication and other technologies of computing devices. For example, they fail to leverage the increasing number of content recording devices, such as audio and/or video content recording devices included in smart-phones and other computing devices. They also fail to make social games more interactive and engaging to users.

SUMMARY

Consistent with the present disclosure, computerized systems and methods are provided for providing social games. Among other embodiments, the present disclosure relates to computerized systems and methods for acquiring, playing, sharing, and updating cross-platform computing device games through a network-based computing environment.

In accordance with one embodiment of the present disclosure, a method is provided that receives a selection from a user to activate the social game for a previously recorded content. The method includes receiving, with at least one processor, the previously recorded content for the social game. The method also includes playing back, in response to the selection, the previously recorded content to the user and recording the user's interaction with the previously recorded content while playing back the previously recorded content.

Consistent with further embodiments of the present disclosure, a system is provided having at least one processor and at least one memory device. The memory device stores a set of instructions which, when executed by the at least one processor, causes the at least one processor to receive a selection from a user to activate the social game for a previously recorded content. The processor is further configured to receive the previously recorded content for the social game. The processor is also configured to play back, in response to the selection, the previously recorded content to the user and record the user's interaction with the previously recorded content while playing back the previously recorded content.

Other embodiments of the present disclosure relate to a tangible, non-transitory computer-readable medium that stores a set of instructions that, when executed by at least one processor, perform a method for providing a social game. The method includes receiving the previously recorded content for the social game. The method further includes playing back, in response to the selection, the previously recorded content to the user and recording the user's interaction with the previously recorded content while playing back the previously recorded content.

The foregoing general description and the following detailed description are exemplary and explanatory only, and are not restrictive of embodiments consistent with the present disclosure. Further, the accompanying drawings, which are incorporated in and constitute a part of this specification, illustrate embodiments of the present disclosure and together with the description, serve to explain principles of the present disclosure.

BRIEF DESCRIPTION OF THE DRAWINGS

The accompanying drawings, which are incorporated in and constitute a part of this disclosure, illustrate several embodiments and aspects of the present disclosure, and together with the description, serve to explain certain principles of the presently disclosed embodiments. In the drawings.

DESCRIPTION OF EXEMPLARY EMBODIMENTS

Reference will now be made in detail to embodiments of the present disclosure, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
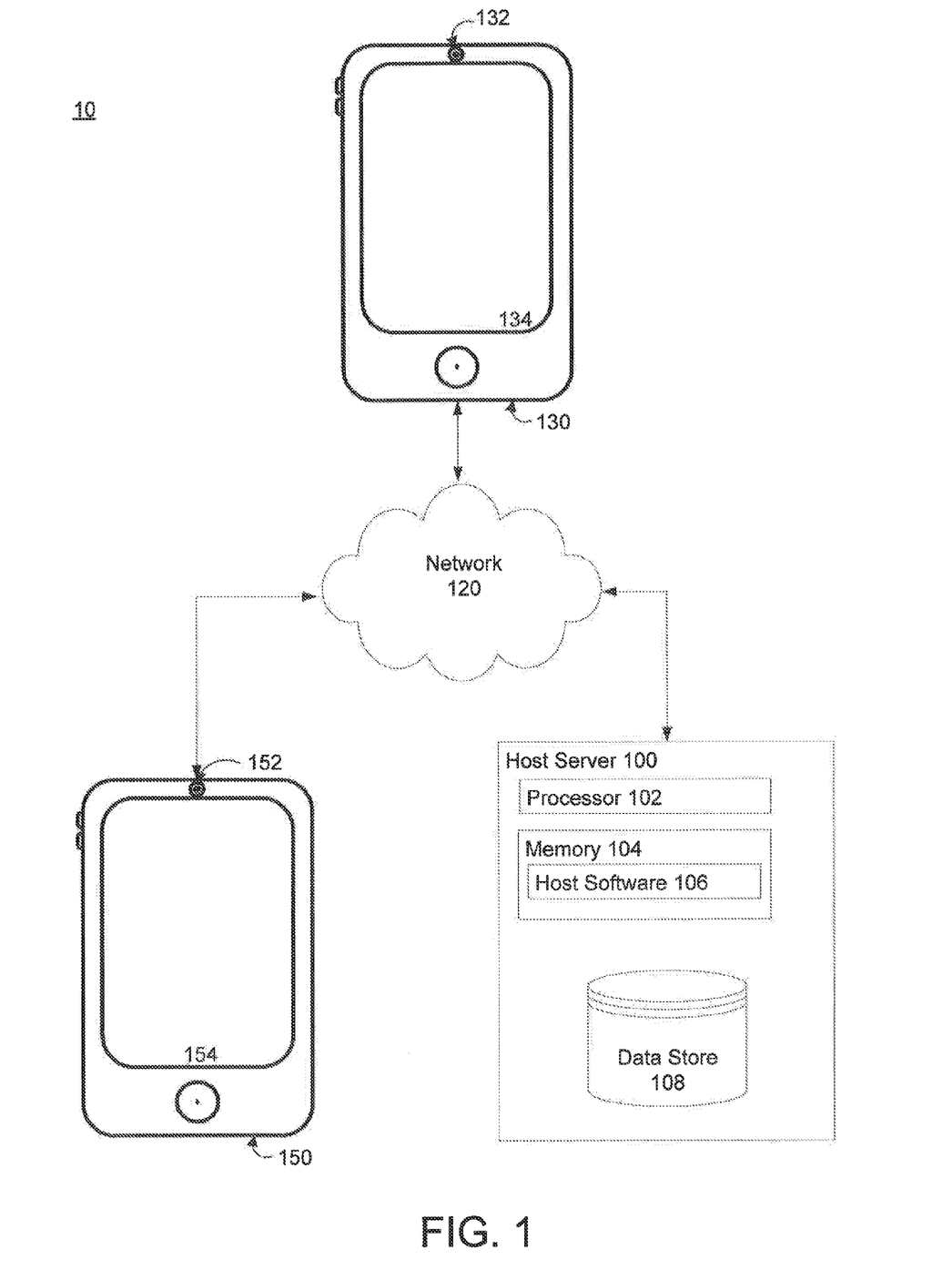
FIG. 1 illustrates a diagram of an exemplary computing environment for practicing embodiments consistent with the present disclosure.

FIG. 1 illustrates a diagram of an exemplary computing environment 10 for practicing embodiments consistent with the present disclosure. The form and arrangement of devices and other elements in FIG. 1 is for purposes of illustration. Embodiments of the present disclosure may be implemented using similar or other arrangements, as well as different quantities of devices and other elements than what is illustrated in FIG. 1.

As shown in FIG. 1, the computing environment 10 may include one or more server systems (e.g., host server 100) and/or computing devices (e.g., computing devices 130 and 150) configured to receive and communicate data over an electronic network (e.g., electronic network 200). The data may include represent any form of information, including text, pictures, videos, etc.

Host servers, such as host server 100, may provide one or more elements of a social game. For example, the host server 100 may facilitate the transfer of content or information between computing devices 130 and 150. This may include streaming a video recorded on device 130 to device 150.

Host server 100 may include a processor 102 and a memory 104. Memory 104 may store host software 106 for execution by processor 102. Memory 104 may include any type of RAM or ROM embodied in a physical storage medium, such as magnetic storage including floppy disk, hard disk, or magnetic tape; semiconductor storage such as solid state disk ("SSD") or flash memory; optical disc storage; magneto-optical disc storage; or any combination thereof. Processor 102 may include one or more processors for processing data according to a set of programmable instructions or software stored in memory 104. The functions of each processor may be provided by a single dedicated processor or by a plurality of processors.

Host server 100 may also include a data store 108. Data store 108 may store data associated with a social game. For example, data store 108 may store one or more video recordings associated with a social game. Data store 108 may be implemented using one or more databases, such as a relational database, an object-oriented database, etc. Data store 108 may be stored locally or may be stored remotely from host server 100.

In the exemplary embodiment of FIG. 1, computing devices 130 and 150 are illustrated as mobile devices or smart-phones. However, as will be appreciated from this disclosure, computing devices 130 and 150 may be implemented as any other type of computing devices, including a personal computer, a laptop, a handheld computer, a PDA, and the like. Computing devices 130 and 150 may include a processor, memory, and/or software similar to processor 102, memory 104, and host software 106. In one embodiment, one or more features of host server 100 may be integrated into computing device 130 and/or computing device 150.

Computing devices 130 and 150 may include recording devices 132 and 152. Recording devices 132 and 152 may be used to record a user's interaction with a social game, including interaction reflected by audio, images, and/or video. For example, recording device 132 may record a user providing clues for a word and recording device 152 may record another user guessing what the word is. Recording devices 132 and 152 may include, for example, an image and/or video camera, a microphone, or any combination thereof.

Computing devices 130 and 150 may also include displays 134 and 154. Displays 134 and 154 may be used to play recordings that are part of the social game. For example, display 154 may play the recording of the user providing clues and display 134 may play the recording of the other user guessing what the word is. Such recordings may include text and/or video. In some embodiments, one or more still images may be recorded and playback, instead of video. Moreover, displays 134 and 154 may provide touch screen interfaces (including representations of a keyboard and one or more buttons) to facilitate user input and selection. Displays 134 and 154 may be implemented by, for example, a liquid crystal display, light-emitting diode display, cathode-ray tube, etc. In addition, computing devices 130 and 150 may include a speaker (not shown) for playing back audio signals recorded with one or more still images or video frames.

In still additional embodiments, computing devices 130 and 150 may also include physical input devices, such as a mouse, a keyboard, one or more buttons, and the like. These physical input devices may be integrated into the computing devices 130 and 150 (such as a centrally mounted control button and side mounted volume/scroll buttons, as represented in FIG. 1) or may be connected to the computing devices 130 and 150, such as an external keyboard (not shown in FIG. 1). Such connections may be conventional electrical connections that are implemented by wired or wireless arrangements.

Electronic network 120 may be implemented with any form or medium for providing digital data communication between host server 100 and computing devices 130 and 150. Examples of electronic network 120 include a local area network ("LAN"), a wireless LAN, e.g., a "WiFi" network, a wireless Metropolitan Area Network (MAN) that connects multiple wireless LANs, a wide area network ("WAN"), e.g., the Internet, and a dial-up connection (e.g., using a V.90 protocol or a V.92 protocol). In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, electronic network 120 may also include one or more mobile device networks, such as a GSM network or a PCS network, that allow mobile devices to send and receive data via applicable communications protocols, including those described above.

Figure 2:
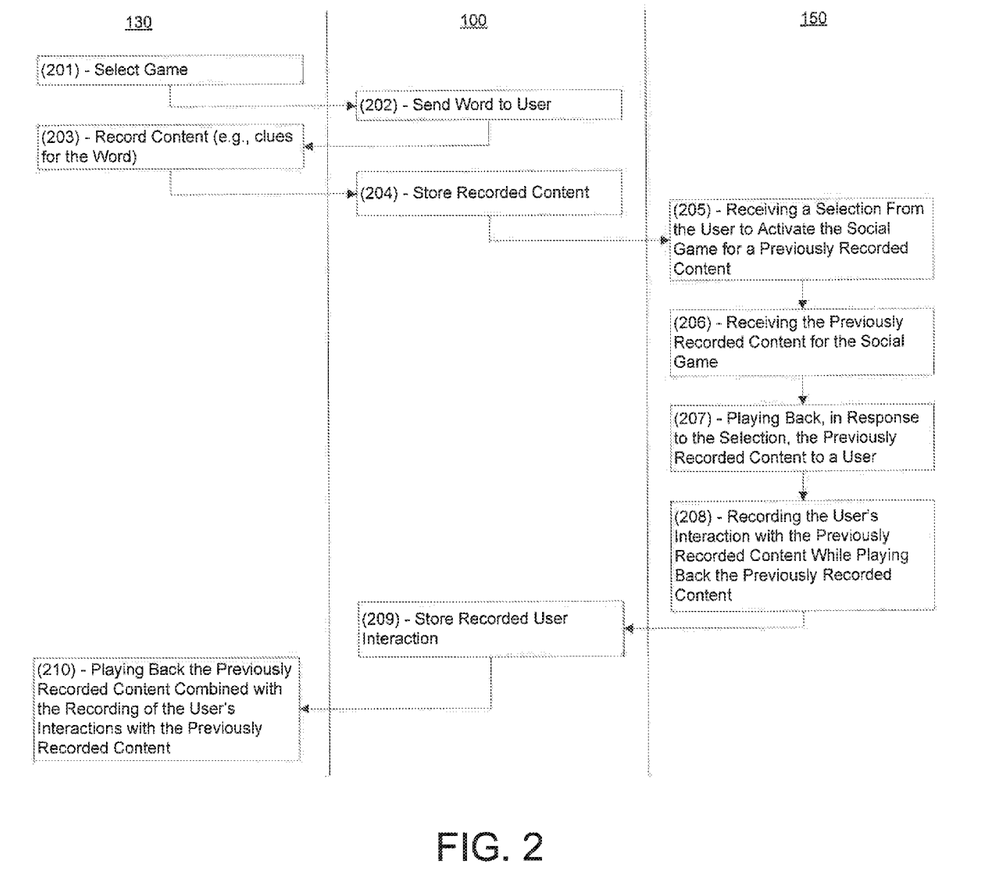
FIG. 2 illustrates an exemplary process for providing a social game on computing devices, consistent with embodiments of the present disclosure.

The above system, components, and software associated with FIG. 1 may be used to implement various methods and processes consistent with the present disclosure, such as the exemplary process illustrated in FIG. 2. In addition, as will be appreciated from this disclosure, the above system, components, and software may be used to implement the methods, graphical user interfaces, and features described below.

FIG. 2 illustrates an exemplary process for providing a social game, consistent with embodiments of the present disclosure. In step 201, a user may use computing device 130 to select a game. This may be performed using one or more input devices (not shown). An input device may be, for example, a touch interface, a mouse, one or more buttons, a keyboard, a voice command interface, etc. Selecting a game may include, for example, a user selecting one or more friends to play a game with or a type of game. For example, a user may find another user to play with using a social network such as Facebook™. In another example, a user may find another user via a game application such as Game Center™. In a further example, a user may find another user by choosing a random player and/or by choosing a recently played user. In another example, a user may find another user to play by email and/or by username.

Selecting a game may also include, for example, a user inviting one or more friends or other users to play a game with. For example, a user may invite one or more users from their contacts or address book. In another example, a user may invite one or more users via a social network site, like for example, Facebook™, Twitter™, Viddy™, etc.

In step 202, host server 100 may send content or information for playing a game to computing device 130. In the context of a game for guessing words, where one user is provided with a word and gives one or more clues related to the word to another user, this may include, for example, sending a word to a user. This may also include sending rules or instructions to the user of computing device 130, such as one or more words that the user cannot say. For example, if the word is "house" the user may not be allowed to say "home." The above examples are provided for illustration. It will be appreciated from this disclosure that other content or information, including rules or instructions for playing a game, may be provided by host server 100 to computing device 130. In addition, for interactive games, the host server 100 may control and provide a sequence of content or information to computer device 130.

In step 203, recording device 132 may record the user providing one or more clues for the provided word. The recorded content may be processed, by the processor (such as a processor (not shown in FIG. 1 of computing device 130)), to determine if the user said one of the do not say words. Continuing with the "house" example, if the user said or entered the word "home" the recorded content may be flagged as improper or cheating content. The recorded content may then be transmitted to host server 100. Alternatively, improper content or cheating detection may be performed by processor 102 of host server 100. Cheating detection may employ, for example, speech recognition software that processes the recording to determine whether the recording includes any of the words the user was instructed not to say. If the recording includes text entered with a keyboard or other input device, the cheating detection may employ, for example, an algorithm or set of instructions for comparing entered content with a list of improper or blocked terms.

In step 204, host server 100 may store the recorded content. For example, host server 100 may store the recorded content in data store 108. This may include, for example, storing metadata or an index to associate the recorded content with an instance or time sequence of the social game. In some embodiments, recorded content may be stored for as long as the game is active. In other embodiments, the recorded content may be stored temporarily for a limited time period or permanently archived for subsequent playback on demand. In step 204, host server 100 may provide the recorded content to computing device 150. For example, host server 100 may stream recorded audio and/or video content from computing device 130 to computing device 150. In some embodiments, the recorded content may include text entered by an input device. In still other embodiments, the record content may comprise one or more still images instead of (or together with) video frames.

In step 205, a user of computing device 150 may enter a selection to activate the social game for the recorded content. This may be performed using one or more input devices (not shown). An input device may be, for example, a touch interface, a mouse, one or more buttons, a keyboard, a voice command interface, etc. Selecting a game may include, for example, resuming a previously played game with another user. This may include, for example, a list of social games displayed on display 154. In one embodiment, the list includes a list of all games in which another user has requested to play a social game with the user of computing device 150. As discussed above, these games may have been previously started by another user by, for example, recording a set of clues about a word.

In some embodiments, step 205 may be modified and/or combined with step 206 (described below) such that the user of computing device 150 merely accepts an invitation to play the game and then receives the recorded content, or the record content is provided automatically to computing device 150 and the user of computing device 150 merely enters a selection to open and/or view the recorded content.

In step 206, computing device 150 may receive the recorded content for the social game from the host server 100. This may include, for example, streaming the recorded content, including audio and/or video content. As noted above, in some embodiments, the recorded content may include text entered by an input device. In still other embodiments, the record content may comprise one or more still images instead of (or together with) video frames.

In step 207, computing device 150 may use display 154 and/or other components (such as a speaker (not shown in FIG. 1) to playback the recorded content to the user of computing device 150. In step 208, computing device 150 may use recording device 152 to record the user's interaction with the recorded content while display 154 and/or other components (such as a speaker) plays back the recorded content. In one embodiment, display 154 may display both the recorded content and the user's interaction with the recorded content.

Returning to the "house" example, the user at computing device 150 may interact with the recorded content by, for example, attempting to guess the word based on the one or more clues provided by the user of computing device 130. The response from the user at computing device 150 may be recorded using any combination of text, audio, and/or video. In some embodiments, the response provided by the user at computing device 150 may be analyzed to determine if the word (e.g., "house") was properly determined by the user. This may be done by use of speech recognition and/or word comparison or matching using a processor of computing device 150 or, alternatively, a processor of host controller 100.

Referring again to step 208 in FIG. 2, computing device 150 may transmit the recording of the user's interaction to host server 100. Alternatively, the content may be streamed from recording device 152 to host server 100. In step 209, host server 100 may store the recording of the user's interaction. This may include, for example, storing metadata or an index indicating that the recording of the user's interaction is associated with a particular instance or time sequence of the social game. In some embodiments, the recorded user's interaction may be stored for as long as the game is active. In other embodiments, the recorded content may be stored temporarily for a limited time period or permanently archived for subsequent playback on demand.

In step 210, computing device 130 may playback the previously recorded content combined with the recording of the user's interactions with the previously recorded content. In one embodiment, the previously recorded content is synchronized with the recording of the user's interactions. For example, the synchronization comprises starting playback of the previously recorded content when the playback of the recording to the user's interactions with the previously recorded content is started. In other embodiments, step 210 may comprise only playback of the recorded user's interactions with the previously recorded content (i.e., without synchronization).

In one embodiment, the user of computing device 130 or the user of computing device 150 may share the recorded content and/or other interactions related to an entire game sequence or only portions of a game sequence. For example, the user may share the recorded content to social network sites, such as Facebook™ or Viddy™. In another example, the user of computing device 130 or 150 may share the recorded content to host server 100, which hosts or provides a community repository. In some embodiments, the community repository may be a collection of recorded content that can be shared with other users.

The steps illustrated in FIG. 2 may be repeated in whole or in part, depending on the sequence of the game and number of clues required before the word is determined. For example, there may be repeated cycles of content recorded between the user of computing device 130 (e.g., corresponding to clues for a word) and the user of computing device 150 (e.g., corresponding to responses to the clues or guesses for the word). Moreover, as will be appreciated from this disclosure, the exemplary process of FIG. 2 may be adapted to implement games that are directly handled or controlled between computing devices 130 and 150 (i.e., without a host controller and/or with the features of the host controller distributed between the computing devices), as well as for other types of games, including other types of social games with recorded content and interactions.

In some embodiments, if the user guesses incorrectly, the user may be required to spend tokens or credits to continue gameplay and submit further guesses. In such cases, the steps illustrated in FIG. 2 may be repeated in whole or in part. Further, in some embodiments, the user may win tokens or credits when correctly guessing a word. Additionally, or alternatively, the user may purchase tokens or credits to use during gameplay.

Figure 3:
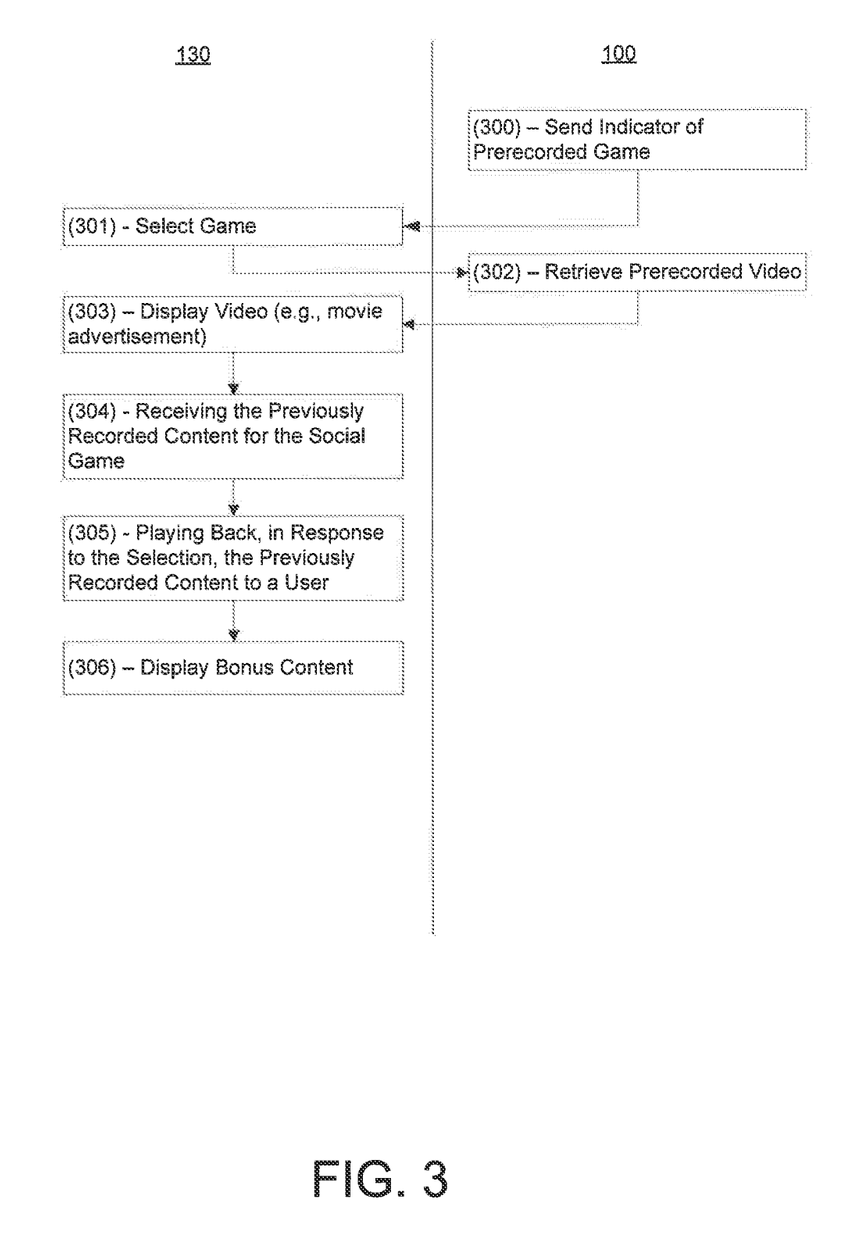
FIG. 3 illustrates an exemplary process for providing a social game with prerecorded content, consistent with embodiments of the present disclosure.

FIG. 3 illustrates an exemplary process for providing a social game with a prerecorded content, consistent with embodiments of the present disclosure. In step 300, host server 100 may send indicator of a prerecorded game to computing device 130. In one embodiment, the indicator may be an advertisement and sales offer. The advertisement or sales offer may be branded based on the good or service being offered.

In step 301, a user may use computing device 130 to select a game or advertisement. In some embodiments, this may be performed using one or more input devices, such as a touch screen interface, a keyboard, a mouse, one or more buttons, voice command interface, etc. Selecting a game may include, for example, the user selecting to play a prerecorded video for practice. In another example, a prerecorded advertisement video is played to the user. The prerecorded advertisement may include one of more games related to the advertised product or service. In another example, the prerecorded content may be recorded by one or more celebrities. This may provide the user with the appearance of interacting in the social game with the one or more celebrities. This may also be used to entice the user to share the social game over a social network. In some embodiments, the prerecorded content may be branded with the good or service being advertised.

In one example, a celebrity may record one or more clues for the word. The word may be chosen to relate to the good or service being offered. For example, the celebrity may be an actor from a movie that is being advertised. The word to be guessed may relate to the subject matter for the movie. For example, if the movie is about pirates the word may be "cannon."

In step 302, host server 100 may send the content for the prerecorded game to computing device 130. In step 303, computing device 130 may show the content using device display 132 of computing device 130.

In step 304, computing device 130 may receive the recorded content for the social game from the host server 100. This may include, for example, streaming the recorded content from host server 100. Alternatively, or additionally, computing device 130 may receive the recorded content from a community repository, such as a community repository provided by host server 100. In step 305, computing device 130 may use display 132 to playback the recorded content to a user in response to selecting the game. In another example, computing device 130 may use display 132 to playback the recorded content to a user automatically.

In step 306, bonus content may be displayed to computing device 130. For example, a bonus movie clip may be displayed to the user to guess what the movie is. This may result in bonus points being accumulated and/or bonus content being displayed. In some embodiments, a correct guess or response may result in the user receiving a promotion item or incentive, such as goods or services or credits to purchase the same.

Figure 4:
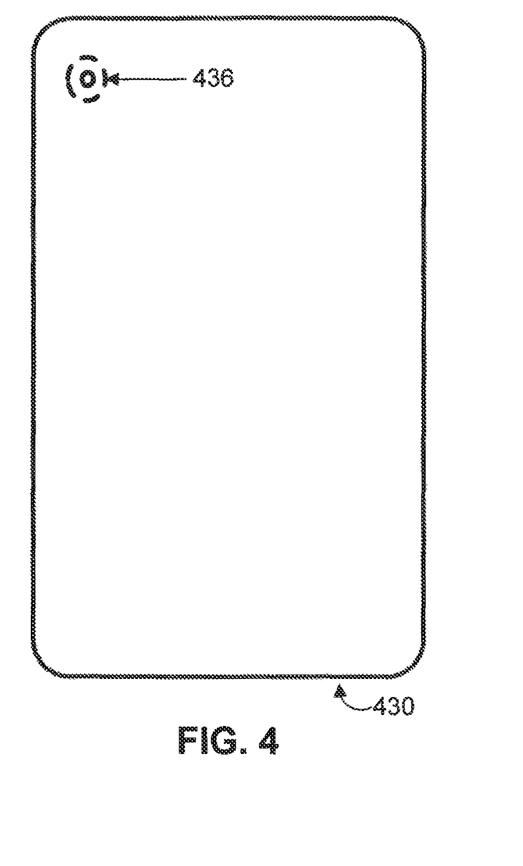
FIG. 4 shows, diagrammatically, a back view of an exemplary mobile device, consistent with embodiments of the present disclosure.

FIG. 4 shows, diagrammatically, a back view of an exemplary mobile device 430, consistent with embodiments of the present disclosure. As shown in FIG. 4, mobile device 430 is a computing device with a recording device 436 provided on the back. Recording device 436 may comprise an image or video recording device. In addition, recording device 436 may include or be associated with other recording devices, such as an microphone or display screen (not shown). In another example, recording device may be an external device connected to computing device 430 (not shown). In some embodiments, the front view of mobile device 430 is designed with a similar arrangement and/or assembly of features as that provided for computing device 130 or 150 in FIG. 1 (i.e., with a display, one or more buttons, etc.).

Figure 5A:
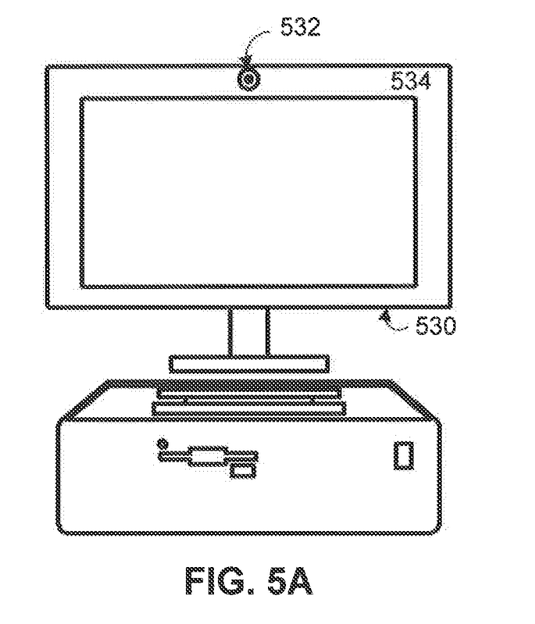
FIG. 5A shows, diagrammatically, a front view of an exemplary computing device, consistent with embodiments of the present disclosure.
Figure 5B:
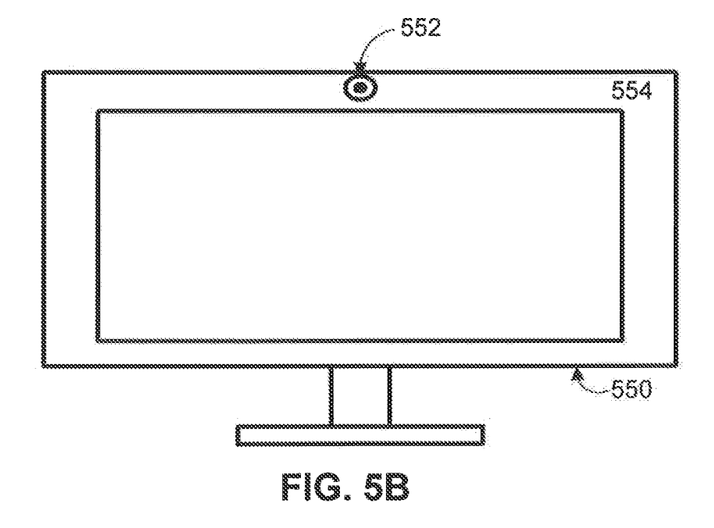
FIG. 5B shows, diagrammatically, a front view of an exemplary TV device, consistent with embodiments of the present disclosure.

FIGS. 5A and 5B show, diagrammatically, front views of exemplary computing devices 530 and 550, consistent with embodiments of the present disclosure. Computing devices 530 and 550 may be used to implement the various embodiments of the present disclosure, including the system environment of FIG. 1 and the exemplary processes of FIGS. 2 and 3. In particular, FIG. 5A illustrates a front view of an exemplary computing device 530 in the form of a desktop or personal computer, with Internet or network access. In contrast, FIG. 5B illustrates a front view of an exemplary computing device 550 in the form of a TV, such as an Internet or networked TV device.

As shown in FIGS. 5A and 5B, computing devices 530 and 550 may include recording devices 532 and 552. Recording devices 532 and 552 may be used to record a user's interaction with a social game, including interaction reflected by audio, images, and/or video. For example, recording devices 532 and 552 may record a user providing clues for a word and/or may record a user guessing what the word is. Recording devices 532 and 552 may include, for example, an image and/or video camera, a microphone, or any combination thereof.

Computing devices 530 and 550 may include displays 534 and 554. Displays 534 and 554 may be used to play recordings that are part of a social game or other content, such as advertisements, sales offers, incentives, and celebrity recordings. By way of example, displays 534 and 554 may play the recordings of a user providing clues and/or the recordings of another user guessing what the word is. Such recordings may include text and/or video. In some embodiments, one or more still images may be recorded and playback, instead of video. Moreover, displays 534 and 554 may provide touch screen interfaces (including representations of a keyboard and one or more buttons) to facilitate user input and selection. Displays 534 and 554 may be implemented by, for example, a liquid crystal display, light-emitting diode display, cathode-ray tube, etc. In addition, computing devices 530 and 550 may include a speaker (not shown) for playing back audio signals recorded with one or more still images or video frames.

In still additional embodiments, computing devices 530 and 550 may also include physical input devices (not shown in FIGS. 5A and 5B), such as a mouse, a keyboard, one or more buttons, and the like. These physical input devices may be integrated into the computing devices 530 and 550 or may be connected to the computing devices 530 and 550, such as an external keyboard or remote control (not shown in FIGS. 5A and 5B). Such connections may be conventional electrical connections that are implemented by wired or wireless arrangements.

The form and arrangement of these devices and other elements in FIGS. 5A and 5B are for purposes of illustration. Embodiments of the present disclosure may be implemented using similar devices and other elements than what is illustrated in FIGS. 5A and 5B.

Figure 6:
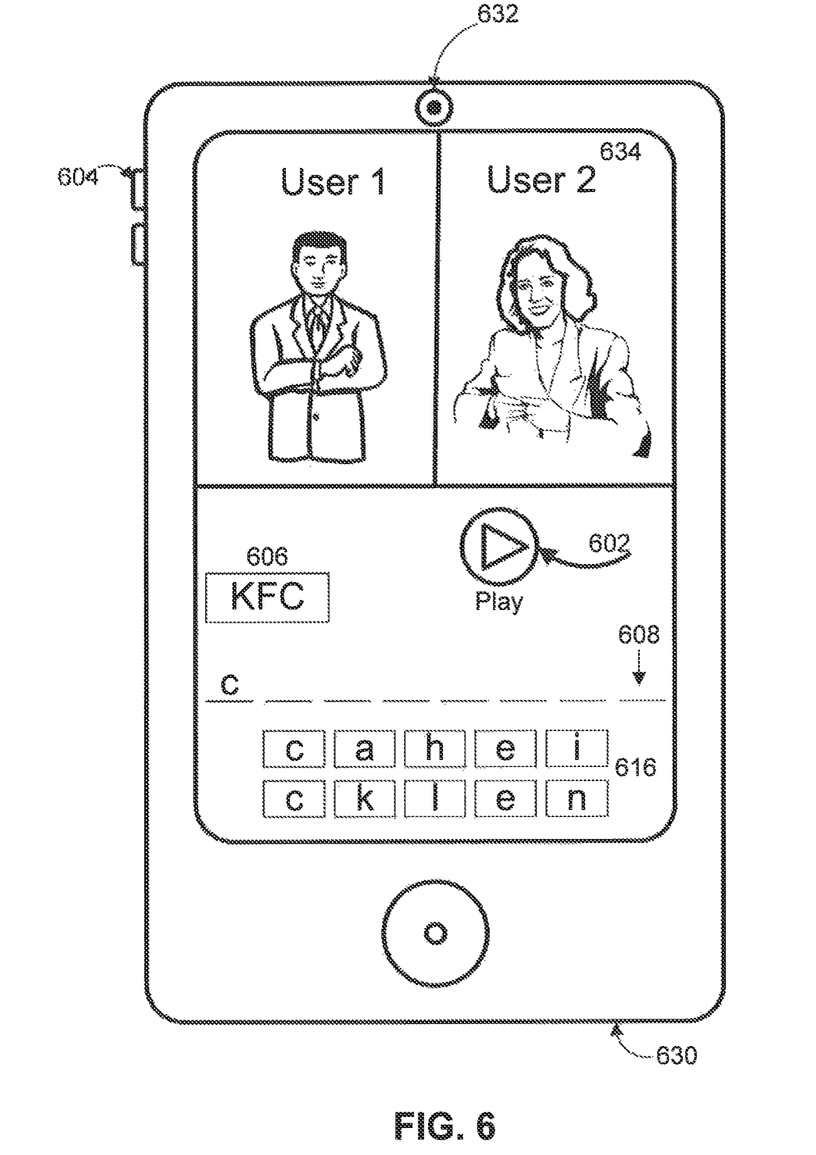
FIG. 6 depicts an exemplary display of a computing device for a social game, consistent with embodiments of the present disclosure.

FIG. 6 illustrates a screenshot of an exemplary display of a computing device 630 for a social game, consistent with embodiments of the present disclosure. Computing device 630 may be implemented as a mobile phone, smart-phone, television, or handheld computer or tablet. Computing devices 630 may be used to implement the various embodiments of the present disclosure, including the system environment of FIG. 1 and the exemplary processes of FIGS. 2 and 3.

As shown in FIG. 6, computing device 630 includes a recording device 632 and a display 634. Recording device 632 and display 634 may be implemented in a similar manner to the recording devices and displays described above, including that described above with reference to the embodiments of FIGS. 1, 4, 5A, and 5B. Computing device 630 also includes integrated controls in the form of, for example, input buttons such as camera button 604. Additionally, or alternatively, camera button 604 may be implemented to provide other controls, such as a scrolling function, a mouse function, a volume control, and/or a selection function. Camera button 604 may be implemented by a nonphysical button, for example, a touch screen input.

As further illustrated in FIG. 6, display 634 includes a representative screenshot of an interaction for a social game between two users, User 1 and User 2. User 1 may be the owner or operator of a computing device, and User 2 may be the owner or operator of another computing device that is communication with communication with computing device of User 1 via a host controller (such as host controller 100) and by means of a network (such as network 120).

In the screenshot represented in display 634, User 1 and User 2 are engaged in a social game, such as a game that involves the guessing of a word. Recorded content, in the form of synchronized video, may be displayed at the top of the display 634, as shown in FIG. 6. Further, the display 634 may provide a touch screen interface with control buttons, such as playback button 602, and/or a text entry field 608 for submitting responses to guess the word. The display 634 may also include clues for the word in the form of a clue 606 and/or scrambled letters containing the word to be guessed 616 to assist the user. The clue 606 may be displayed as a result of the user using tokens to display a hint. As will be appreciated, other forms and arrangements of display 634 are possible, consistent with embodiments of the present disclosure.

In some embodiments, display 634 may display User 1 recorded content playing to User 2 while recording device 632 captures User 2 guessing the word. The recording of User 2 and playing back of User 1 may be triggered by the activation of the playback button 602. In still additional embodiments, a limited amount of time may be provided for recording User 2.

While illustrative embodiments have been described herein, the scope of thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A computer-implemented method for providing a social game, the method comprising:
   receiving a selection from a user to activate the social game using previously recorded content;
   receiving, at a computing device of the user, the previously recorded content for the social game, the previously recorded content including clues for a word that are presented by another user;
   playing back, in response to the selection, the previously recorded content to the user;
   recording, with a camera located at the computing device, the user's live interaction with the previously recorded content while playing back the previously recorded content, the user's live interaction including one or more guesses for the word in response to the clues presented by the other user; and
   analyzing, with at least one processor, the user's live interaction with the previously recorded content to determine if the user correctly guessed the word according to winning criteria of the social game.

2. The method of claim 1, further comprising playing back the previously recorded content combined with the recording of the user's interactions with the previously recorded content.

3. The method of claim 2, wherein the previously recorded content is synchronized with the recording of the user's interactions.

4. The method of claim 3, wherein the synchronization comprises starting playback of the previously recorded content when the playback of the recording to the user's interactions with the previously recorded content is started.

5. The method of claim 1, further comprising sharing, with other users, the previously recorded content combined with the recording of the user's interactions with the previously recorded content.

6. The method of claim 5, wherein the previously recorded content is synchronized with the recording of the user's interactions.

7. The method of claim 5, wherein sharing comprises sharing on a social network.

8. The method of claim 1, further comprising:
synchronizing the previously recorded content with the recording of the user's interactions, wherein synchronizing includes ending the playback of the previously recorded content when it is determined that the user correctly guesses the word; and
displaying a message on the computing device of the user to indicate a status of the social game.

9. A computing device system for providing a social game, the system comprising:
at least one processor;
at least one memory device storing a set of instructions which, when executed by the at least one processor, causes the at least one processor to:
receive a selection from a user to activate the social game using previously recorded content;
receive the previously recorded content for the social game, the previously recorded content including clues for a word that are presented by another user;
play back, in response to the selection, the previously recorded content to the user;
record, with a camera located at a computing device of the user, the user's live interaction with the previously recorded content while playing back the previously recorded content, the user's live interaction including one or more guesses for the word in response to the clues presented by the other user; and
analyze the user's live interaction with the previously recorded content to determine if the user correctly guessed the word according to winning criteria of the social game.

10. The system of claim 9, wherein the set of instructions further cause the at least one processor to:
play back the previously recorded content combined with the recording of the user's interactions with the previously recorded content.

11. The system of claim 10, wherein the previously recorded content is synchronized with the recording of the user's interactions.

12. The system of claim 11, wherein to synchronize the set of instructions further cause the at least one processor to:
start playback of the previously recorded content when the playback of the recording to the user's interactions with the previously recorded content is started.

13. The system of claim 9, the set of instructions further causing the at least one processor to:
share, with other users, the previously recorded content combined with the recording of the user's interactions with the previously recorded content.

14. The system of claim 13, wherein the previously recorded content is synchronized with the recording of the user's interactions.

15. The system of claim 13, wherein the set of instructions further cause the at least one processor to:
share the combined content on a social network.

16. The system of claim 9, wherein the set of instructions further cause the at least one processor to:
synchronize the previously recorded content with the recording of the user's interactions, wherein synchronizing includes ending the playback of the previously recorded content when it is determined that the user correctly guesses the word; and
display a message on the computing device of the user to indicate a status of the social game.

17. A non-transitory computer readable medium storing a set of instructions that, when executed by at least one processor, cause the at least one processor to perform a method for providing a social game, the method comprising:
receive a selection from a user to activate the social game using previously recorded content;
receive the previously recorded content for the social game, the previously recorded content including clues for a word that are presented by another user;
play back, in response to the selection, the previously recorded content to the user;
record, with a camera located at a computing device of the user, the user's live interaction with the previously recorded content while playing back the previously recorded content, the user's live interaction including one or more guesses for the word in response to the clues presented by the other user; and
analyze the user's live interaction with the previously recorded content to determine if the user correctly guessed the word according to winning criteria of the social game.

18. The computer-readable medium of claim 17, wherein the method enabled by the set of instructions and at least one processor further comprises:
playing back the previously recorded content combined with the recording of the user's interactions with the previously recorded content.

19. The computer-readable medium of claim 17, wherein the method enabled by the set of instructions and at least one processor further comprises:
sharing the previously recorded content combined with the recording of the user's interactions with the previously recorded content.

20. The computer-readable medium of claim 19, wherein the previously recorded content is synchronized with the recording of the user's interactions.

21. The computer-readable medium of claim 17, wherein the method enabled by the set of instructions and at least one processor further comprises:
synchronizing the previously recorded content with the recording of the user's interactions, wherein synchronizing includes ending the playback of the previously recorded content when it is determined that the user correctly guesses the word; and
displaying a message on the computing device of the user to indicate a status of the social game.

* * * * *